C. D. ROGERS.
WOOD SCREWS.

No. 178,028. Patented May 30, 1876.

WITNESSES. INVENTOR.
William W Swan Charles D. Rogers

UNITED STATES PATENT OFFICE.

CHARLES D. ROGERS, OF PROVIDENCE, RHODE ISLAND.

IMPROVEMENT IN WOOD-SCREWS.

Specification forming part of Letters Patent No. 178,028, dated May 30, 1876; application filed March 27, 1876.

*To all whom it may concern:*

Be it known that I, CHARLES D. ROGERS, of Providence, in the State of Rhode Island, have invented an Improved Wood-Screw, of which the following is a specification:

In a patent granted to me May 9, 1876, for a screw-machine, I have fully described and claimed mechanism for making a screw which shall embody the novel and desirable features for which I claim protection herein, the present invention having reference only to the screw itself, as a new product resulting from said improved mechanism.

Figures 1, 2:
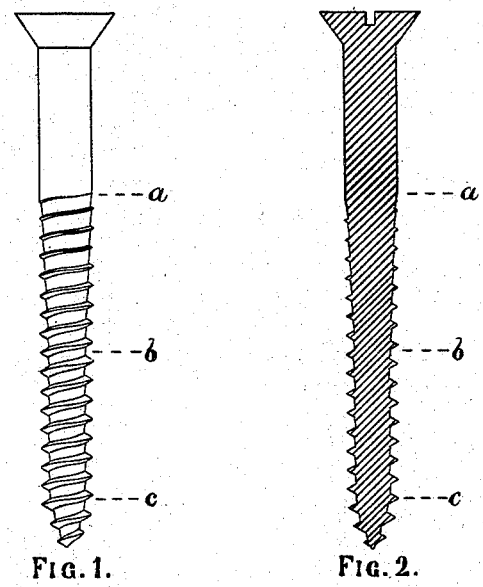
Figures 3, 4:
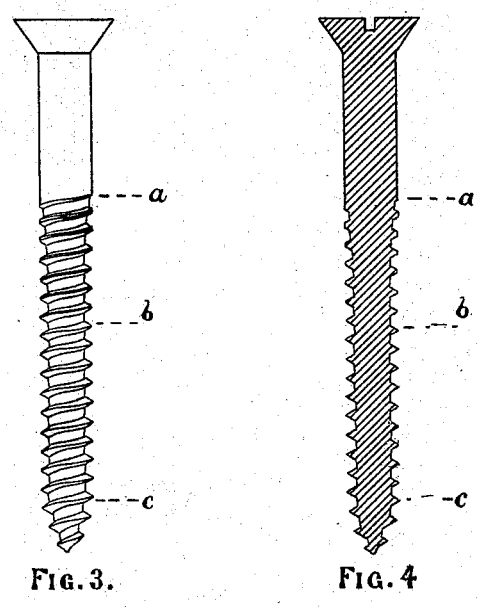

In the drawings, Figure 1 is a side elevation of my improved screw. Fig. 2 is a sectional elevation of the same. Figs. 3 and 4 are the same elevations of a screw such as has heretofore been made in the machine upon which I have ingrafted my improvement in screw machinery referred to above.

It will be observed that the two screws are alike over the point from $c$ out, and also over the portions having a cylindrical body from $b$ to $c$, where the threads of both screws are brought to an edge, and where the cuts of both are of uniform depth and uniform width; but that at the cones, from $a$ to $b$, the two screws differ essentially, the old screw, shown in Figs. 3 and 4, having a thread beginning flat on the top at $a$, and gradually coming to an edge at $b$, while the new screw, shown in Figs. 1 and 2, has all the way from $a$ to $b$ a thread brought to an edge of the same angle as from $b$ out.

It is obvious that the old form of screw is imperfect, for it is clear that the widening thread over the cone will not follow the sharp thread which is over the body of the screw as readily as if the thread were everywhere brought to the same sharp edge.

I am aware that screws formed in dies may be made with any form of thread over the cone; but such screws have jogs or shoulders in the bottoms of as many of the paths over the cone as there are cutting-teeth to the die, from which objectionable feature my screw is free.

I am also aware of the Letters Patent No. 65,651. My screw differs essentially from the screw shown therein, in having a considerable portion of its core cylindrical, and consequently in having a succession of threads all cut to a maximum and uniform depth, instead of having but one or a portion of one thread in the whole screw cut to a maximum depth.

I claim—

A pointed wood-screw, having the outer periphery of the thread upon its body cylindrical, while a portion of the body below the thread and near the neck is conical, the remainder of the body to the point being cylindrical, and yet having all the threads brought to an edge of a constant angle without any jogs in the paths between the threads, substantially as described.

CHARLES D. ROGERS.

Witnesses:
WILLIAM W. SWAN,
CHAS. H. SWAN.